(No Model.) 2 Sheets—Sheet 1.

W. STANLEY, Jr.
ALTERNATING CURRENT METER.

No. 494,513. Patented Mar. 28, 1893.

WITNESSES:
Robt. F. Taylord
James. Catlow

INVENTOR
William Stanley Jr.
BY
Duncan & Page
ATTORNEYS.

(No Model.) 2 Sheets—Sheet 2.

W. STANLEY, Jr.
ALTERNATING CURRENT METER.

No. 494,513. Patented Mar. 28, 1893.

WITNESSES:
Robt. F. Gaylord
James Catlow

INVENTOR
William Stanley
BY
Duncan & Page
ATTORNEYS.

UNITED STATES PATENT OFFICE.

WILLIAM STANLEY, JR., OF PITTSFIELD, MASSACHUSETTS.

ALTERNATING-CURRENT METER.

SPECIFICATION forming part of Letters Patent No. 494,513, dated March 28, 1893.

Application filed August 11, 1892. Serial No. 442,843. (No model.)

*To all whom it may concern:*

Be it known that I, WILLIAM STANLEY, Jr., a citizen of the United States, residing at Pittsfield, in the county of Berkshire and State of Massachusetts, have invented certain new and useful Improvements in Electrical Meters, of which the following is a specification, reference being had to the drawings accompanying and forming a part of the same.

Figure 1:
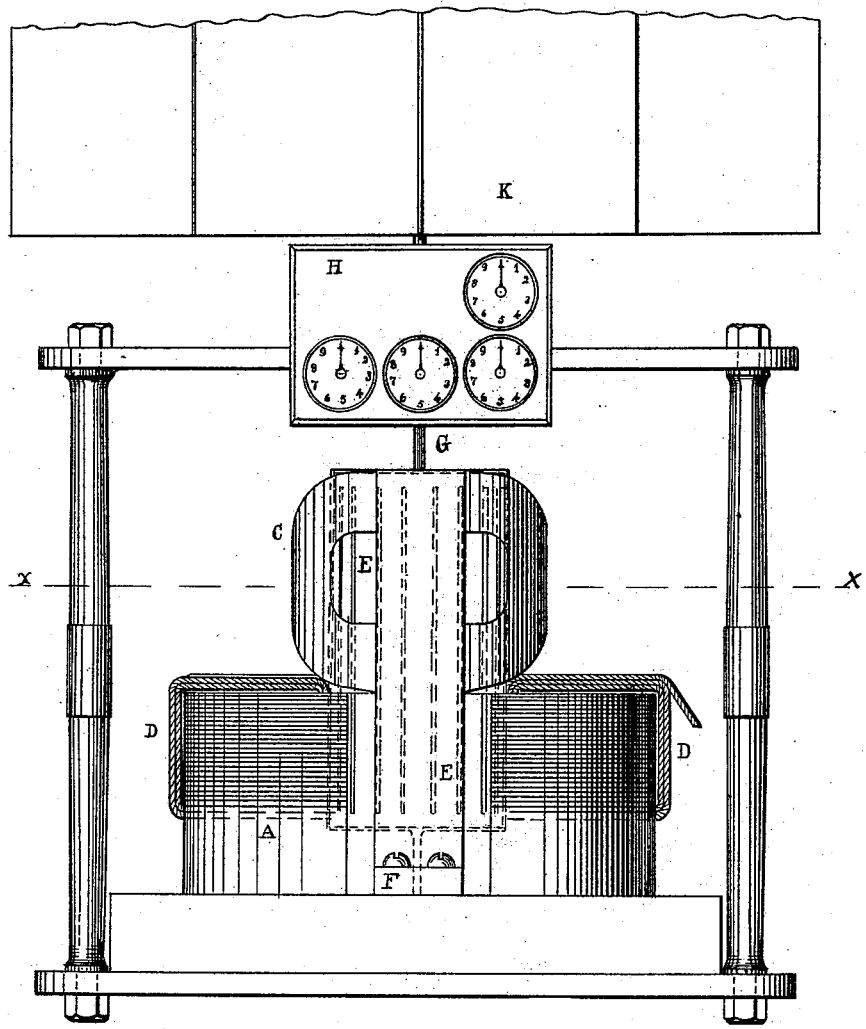
Figure 3:
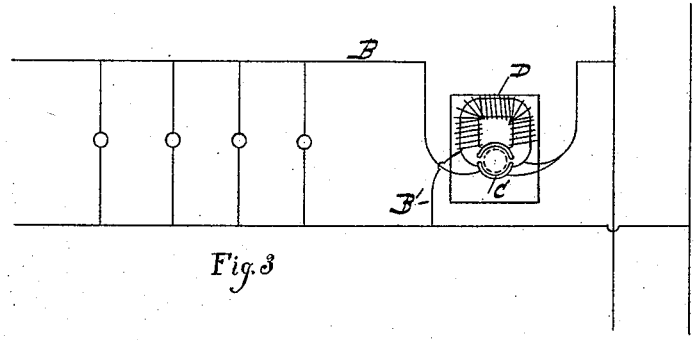
Figure 2:
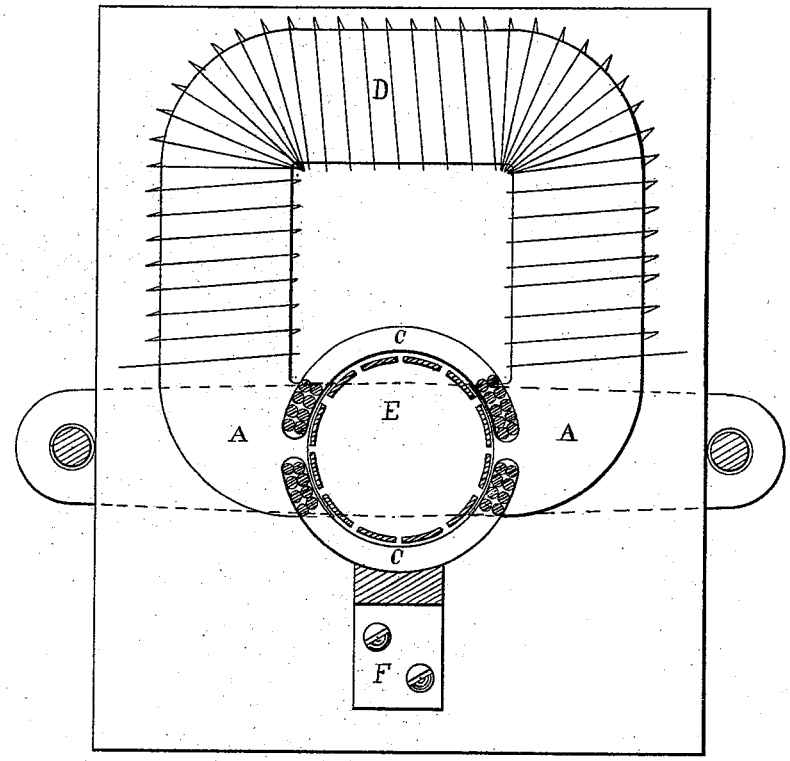

My invention, in the best and most practicable form of which I am at present aware, is illustrated in the accompanying drawings, in which Figure 1 is a front elevation of the instrument complete; Fig. 2 a horizontal section on the line $x$—$x$ of Fig. 1, and Fig. 3 is a diagram illustrating the manner in which the instrument is connected with the circuit in which the current is to be measured.

This instrument I have designed and used as an alternating current Watt meter, for indicating or recording the power conveyed through a circuit by the passing of any alternating current at any pressure, or the rate at which energy is expended or work done by such current.

The constructive details of the instrument, from an understanding of which the nature of the invention and its principle or mode of operation will be more readily comprehended, will be described by reference to the drawings.

Supported on a suitable base or stand is a coil or coils D which should have a high self-induction, for which purpose it may be provided with a laminated iron core A, in order that the lag of the current in the coil when, as in practice, it is connected in a shunt to the circuit in which the current is to be measured, shall be as nearly as possible ninety degrees behind the electro-motive force.

Between the poles of the core A there is a copper cylinder E in which a number of longitudinal slots are formed. This cylinder projects out on one side beyond the polar faces of the core A and is supported on pivotal bearings so as to turn freely. The projecting portion of the cylinder E is inclosed by circular coils C, C, placed on opposite sides of the same and so that their magnetic axes pass through the cylinder at right angles to that of the coils D and core A. The spindle G upon which the copper cylinder is mounted is in gear with suitable registering or counting train and dials H, and is loaded in the usual manner by a fan K or like device.

The principle of construction and operation of the motive part of the instrument is similar to that of the induction motor invented by me and described in my application Serial No. 428,950, filed April 13, 1892, in the following essential particulars: The coils D and C constitute two independent field-producing circuits the currents in which differ by approximately a quarter phase or what is commonly known as ninety degrees, so that at that instant of time when one field exhibits its maximum magnetic effect the other will be minimum. The longitudinal bars of the cylinder E constitute the conductors of closed circuits within the influence of both fields and, by reason of the displacement of the two fields when any bar is in the position of maximum inductive effect with reference to one field it is in the position of maximum torque in the other, and these conditions alternate with the result of maintaining the cylinder in rotation.

In using this instrument as a meter the coils C are included in the circuit B in which the current is to be measured, and the coils D, as above stated, in a shunt B', to the same. The lag in the coil C owing to the absence of self-induction will be dependent mainly on the self-induction of the translating devices in circuit therewith. The velocity of rotation of the cylinder E will depend upon the strength of the current in the circuit of the coils D; upon that in the coils C, and on the difference in phase between the currents in the two. If the electro-motive force in the circuit is constant, the instrument will therefore act as a Coulomb meter, and indicate the quantity of force or ampères delivered in a given time, while if the electro-motive force is variable it will, by reason of the fact that the strength of the current in coil D varies, act as a Joule meter, and indicate the work done by the current in a given time. As the velocity of rotation is dependent in part upon the difference of phase between the currents in the two coils or sets of coils C and D, the instrument will register only the effective coulombs or joules, and not merely apparent current or energy. It may be stated that the instrument in order to work properly should be so constructed or adjusted that the speed of rotation should always be well below that of synchronism.

In confining the description of the invention herein to a particular form of apparatus, I do not wish to be understood as limiting myself to such form. In explanation it may be said that for the armature exemplified by the slotted cylinder E, I may use any other form with longitudinal conductors, and also that in lieu of the special disposition of field coils I may use any of the equivalent arrangements now well known for securing the same relative displacement of the fields and armature coils.

What I claim as my invention is—

1. In an alternating current meter, the combination with two field-producing circuits of different self-induction, one adapted for connection with the circuit in which the current is to be measured, the other in a shunt to said circuit, of rotating conductors forming circuits within the influence of both fields but occupying different relative positions with respect to each, and registering devices connected with said conductors, as set forth.

2. In an alternating current meter, the combination with two field-producing circuits of different self-induction, adapted respectively for connection in series with and in shunt to the translating devices in the circuit in which the current is to be measured, of rotating or armature conductors forming closed circuits common to both fields but in relatively different inductive positions in each, and a train of registering wheels and dials in gear with and operated by the said rotating conductors, as set forth.

3. In an alternating current meter, the combination with a rotary spindle or shaft, a registering device operated thereby, and conductors carried by the spindle and forming closed circuits with paths parallel to the axis of the spindle, of independent field coils or circuits of different self-induction acting on different portions of the said conductors, and having their magnetic axes at an angle, as set forth.

4. The combination with the rotary spindle, the registering train in gear therewith, and the bars or conductors E carried thereby and forming closed circuits, of the coil D and a core A presented to one end of the bars, and the circular coils C inclosing the other end and placed so that the magnetic axes of the two fields produced by the coils shall be at right angles.

WILLIAM STANLEY, JR.

Witnesses:
ROBT. F. GAYLORD,
PARKER W. PAGE.